United States Patent [19]

Ikeda et al.

[11] Patent Number: 5,228,127

[45] Date of Patent: Jul. 13, 1993

[54] CLUSTERED MULTIPROCESSOR SYSTEM WITH GLOBAL CONTROLLER CONNECTED TO EACH CLUSTER MEMORY CONTROL UNIT FOR DIRECTING ORDER FROM PROCESSOR TO DIFFERENT CLUSTER PROCESSORS

[75] Inventors: Masayuki Ikeda; Koichi Ueda, both of Kawasaki, Japan

[73] Assignee: Fujitsu Limited, Kanagawa, Japan

[21] Appl. No.: 526,687

[22] Filed: May 22, 1990

Related U.S. Application Data

[63] Continuation of Ser. No. 271,582, Nov. 15, 1988, abandoned, which is a continuation-in-part of Ser. No. 198,659, May 19, 1988, Pat. No. 4,852,021, which is a continuation of Ser. No. 748,344, Jun. 24, 1985, abandoned.

[30] Foreign Application Priority Data

Nov. 25, 1987 [JP] Japan .................. 62-295333

[51] Int. Cl.⁵ .................. G06F 13/14; G06F 15/16
[52] U.S. Cl. .................. 395/200; 364/229.41; 364/230.6; 364/230.3; 364/238.4; 364/230.1; 364/284.3; 364/931.43; 364/931.46; 364/940.91; 364/940.92; 364/940.64; 364/DIG. 1; 395/325
[58] Field of Search .................. 395/200, 325; 364/200 MS File, 900 MS File

[56] References Cited

U.S. PATENT DOCUMENTS

| | | | |
|---|---|---|---|
| 4,099,233 | 7/1978 | Barbagelata et al. | 364/200 |
| 4,253,144 | 2/1981 | Bellamy et al. | 364/200 |
| 4,253,146 | 2/1981 | Bellamy | 364/200 |
| 4,382,287 | 5/1983 | Ackman | 364/900 |
| 4,470,114 | 9/1984 | Gerhold | 364/200 |
| 4,504,906 | 3/1985 | Itaya et al. | 364/200 |
| 4,523,272 | 6/1985 | Fukunaga et al. | 364/200 |
| 4,564,900 | 1/1986 | Smitt | 364/200 |
| 4,575,793 | 3/1986 | Morel | 364/200 |
| 4,591,981 | 5/1986 | Kassabov | 364/200 |
| 4,593,350 | 6/1986 | Mitchell et al. | 364/200 |
| 4,628,478 | 12/1986 | Henderson, Jr. | 364/900 |
| 4,633,431 | 12/1986 | Bar | 364/900 |
| 4,636,174 | 1/1987 | Andersen | 434/335 |
| 4,636,974 | 1/1987 | Griffin | 364/900 |
| 4,663,706 | 5/1987 | Allen | 364/200 |
| 4,677,588 | 6/1987 | Benjamin | 364/900 |
| 4,691,296 | 9/1987 | Strugee | 364/900 |
| 4,718,006 | 1/1988 | Nishida | 364/200 |
| 4,720,782 | 1/1988 | Kovalcin | 364/200 |
| 4,747,130 | 5/1988 | Ho | 364/200 |
| 4,811,210 | 3/1989 | McAulay | 364/200 |
| 4,814,970 | 3/1989 | Barbagelata | 364/200 |

FOREIGN PATENT DOCUMENTS 0110569 6/1984 European Pat. Off. .
2112186A 7/1983 United Kingdom .

OTHER PUBLICATIONS

European Search Report for EP-88-31-1089, The Hague, Aug. 8, 1990.

*Primary Examiner*—Thomas C. Lee
*Assistant Examiner*—Ken S. Kim
*Attorney, Agent, or Firm*—Staas & Halsey

[57] ABSTRACT

An apparatus and method for controlling clusters having processors constituting a multiprocessor system. The apparatus includes a global control unit for processing orders between clusters and a memory control unit, provided in each cluster, for controlling transmission and reception of orders between the global control unit and the processors. Commands from one processor to another processor are sent to the memory control unit of the cluster containing the other processor and not directly to the other processor.

16 Claims, 8 Drawing Sheets

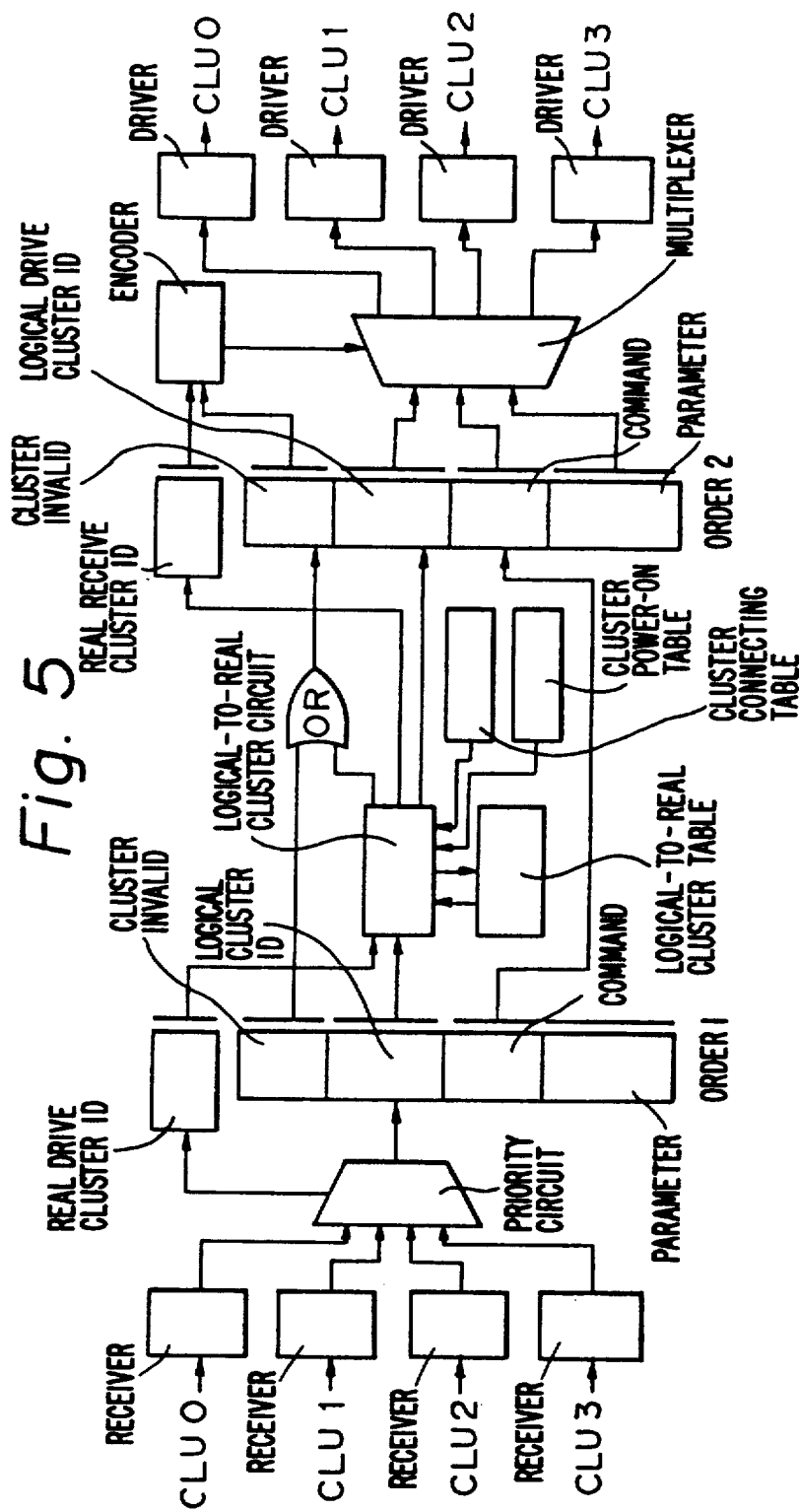

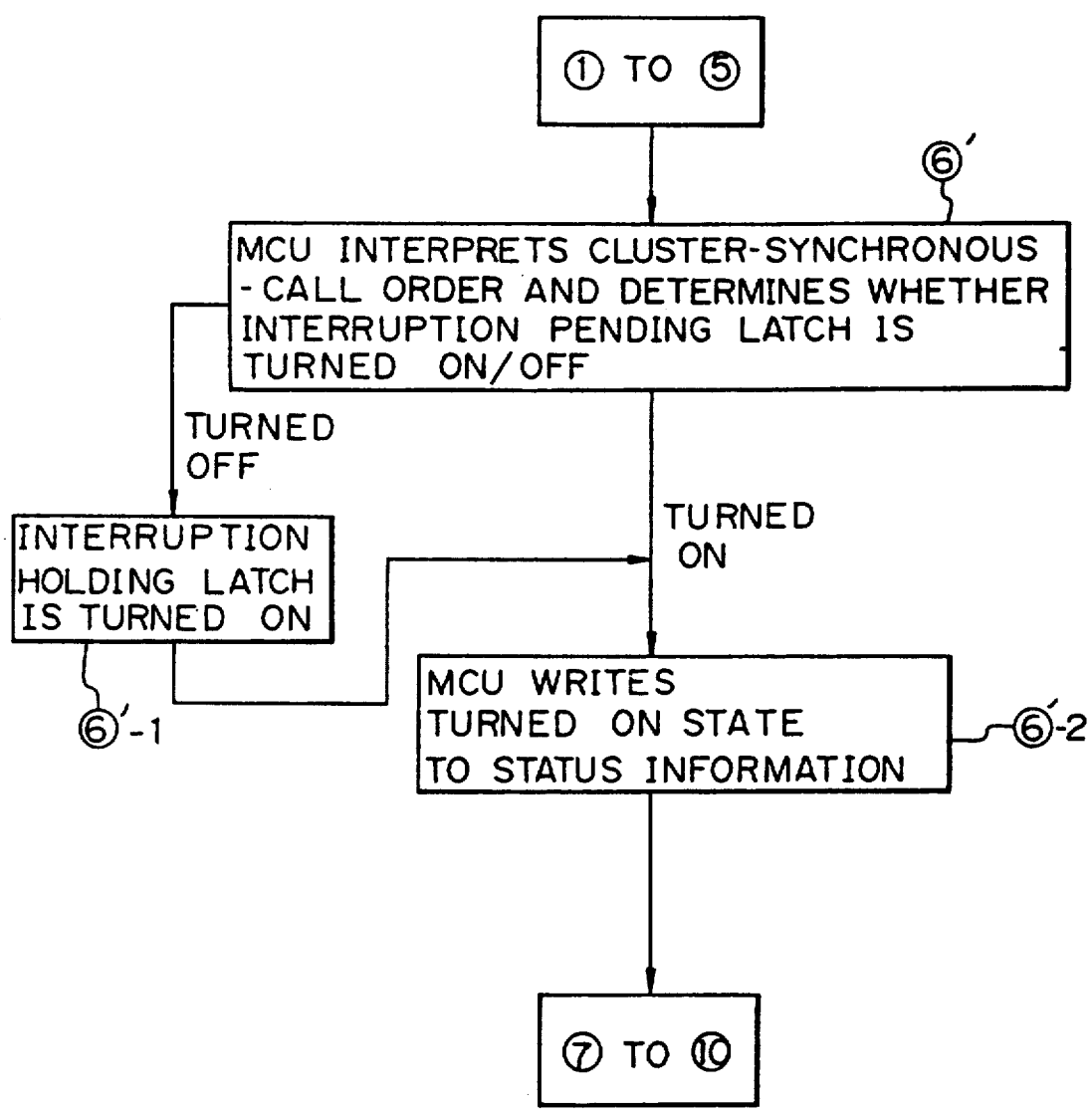

CLUSTERED MULTIPROCESSOR SYSTEM WITH GLOBAL CONTROLLER CONNECTED TO EACH CLUSTER MEMORY CONTROL UNIT FOR DIRECTING ORDER FROM PROCESSOR TO DIFFERENT CLUSTER PROCESSORS

CROSS REFERENCE TO RELATED APPLICATION

This is a continuation of copending application Ser. No. 07/271,582 filed on Nov. 15, 1988, now abandoned, which is a continuation-in-part to U.S. application Ser. No. 198,659, filed May 19, 1988 issued U.S. Pat. No. 4,852,021, which is a continuation of copending U.S. application Ser. No. 748,344, filed Jun. 24, 1984, now abandoned.

BACKGROUND OF THE INVENTION

1. Field of the Invention

The present invention relates to a cluster control system in a multiprocessor system, more particularly, it relates to a method and an apparatus for cluster control of processors constituting the multiprocessor system. The present invention is especially advantageous for large scale numerical simulation in scientific and technical fields where high speed calculations are a necessity.

2. Description of the Related Art

A multiprocessor system has plurality of processors, and for cluster control, the plurality of processors are divided into a plurality of groups, each of which is called a "cluster", and then control of access between processors is performed through each cluster. Namely, each cluster is an element for processing the access control of the processors.

SUMMARY OF THE INVENTION

The object of the present invention is to provide a cluster control system in a multiprocessor system enabling high speed processing of orders between processors and simplification of a cluster control program.

In accordance with the present invention, there is provided a method of cluster control for processors constituting a multiprocessor system comprising the steps of: dividing a plurality of processors constituting the multiprocessor system into a plurality of clusters; defining a state of the clusters based on the state of the processors belonging to, respective clusters; setting an order to one of the clusters; and controlling the processor belonging to that cluster based on the order set to that cluster. Further, in accordance with the present invention, there is provided an apparatus for cluster control of processors constituting a multiprocessor system, the processors being divided into a plurality of clusters, the apparatus comprising: a global control unit connected to each of the clusters through a corresponding bus line, for processing orders between clusters, and a memory control unit provided in each of the clusters and connected between the global control unit and each of a particular processors belonging to the cluster, for controlling the transmission and reception of orders between the global control unit and the processors.

BRIEF DESCRIPTION OF THE DRAWINGS

In the drawings:

FIG. 4 is one example of a format of an order according to the present invention;

FIG. 5 is a schematic block diagram of a global control unit according to an embodiment of the present invention;

FIG. 8 is a flowchart for explaining a SYNCHRONOUS-CALL order according to an embodiment of the present invention; and, FIG. 9 is a flowchart for explaining a CLUSTER-RESET and IPL order according to an embodiment of the present invention.

DESCRIPTION OF THE PREFERRED EMBODIMENTS

Before describing the preferred embodiments, an explanation will be given of a conventional multiprocessor system.

Figure 1:
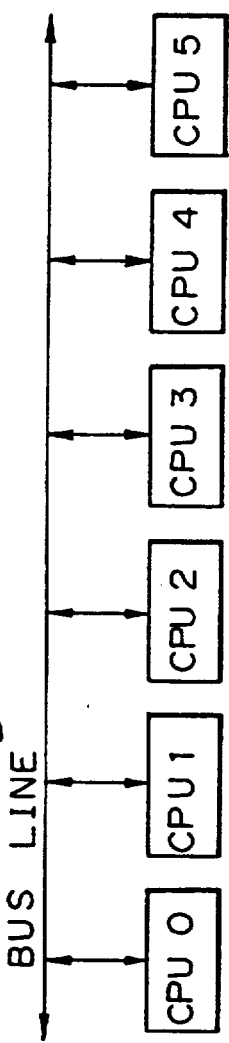
FIG. 1 is a schematic block diagram of a conventional multiprocessor system.

FIG. 1 is a schematic block diagram of a conventional multiprocessor system. In FIG. 1, the multiprocessor system is constituted by, for example, central processing unit, (processors) CPU0 to CPU5, and each processor is connected in parallel to another processor through a bus line BUS. Mutual control is carried out from processor and to another.

In this multiprocessor system, each processor is set to four states having an exclusive relationship therebetween; i.e., any one of four states ("STOP", "OPERATION", "LOAD" and "CHECK-STOP") are set in each processor. When carrying out an access, first processor outputs a sense signal to a second processor, to recognize the state of the second processor, receives a response from the second processor involving the above four states, and carries out mutual control in accordance with the above four states.

In this system, however, a significant amount of time is necessary for the management of access steps between the processors. As a result, it is difficult to achieve high speed processing in the multiprocessor system. Furthermore, the control program is complicated due to the large number of access steps.

Figure 2:
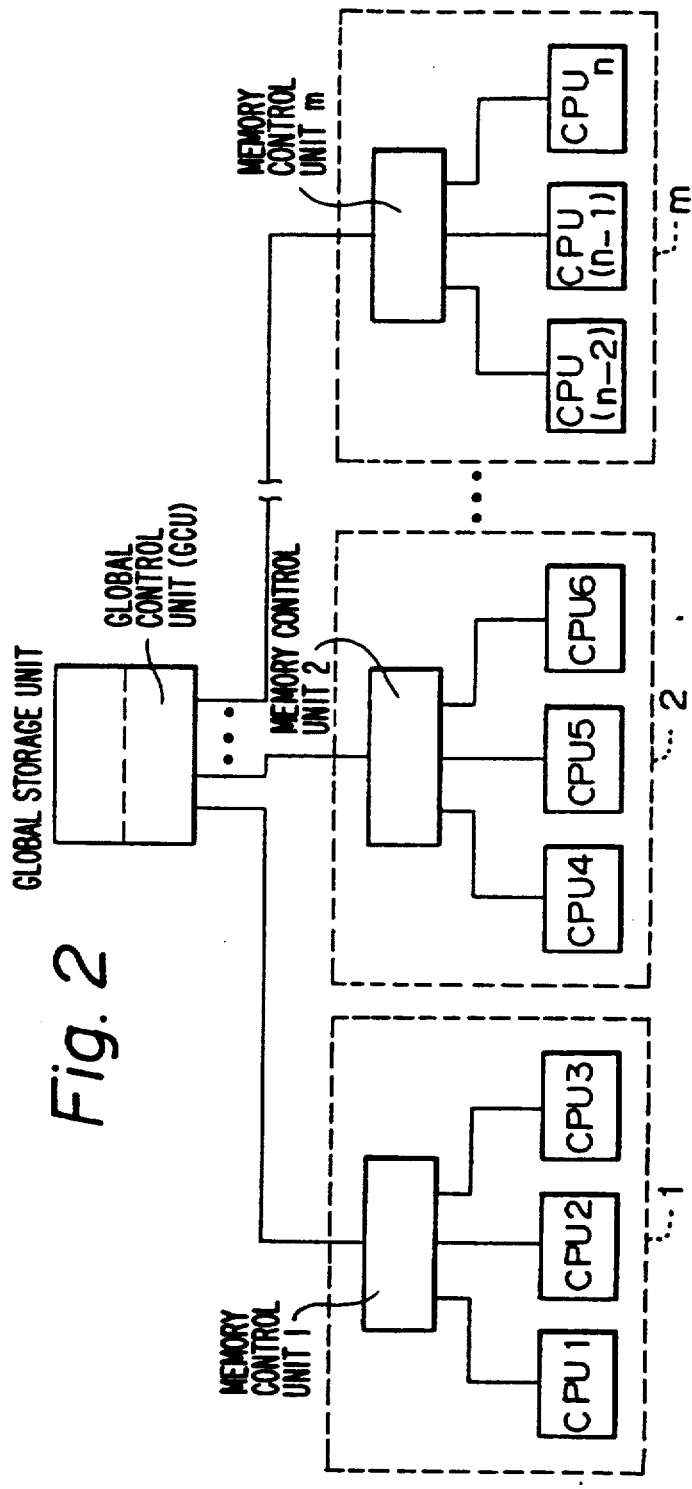
FIG. 2 is a basic block diagram of an apparatus for a cluster control in the multiprocessor system according to the present invention.

FIG. 2 is a basic block diagram of an apparatus for cluster control of a multiprocessor system according to the present invention. In FIG. 2, a plurality of processors CPU1 to CPUn are divided into "m" groups ( 1 to m) each having three processors, with each group being called a "cluster". MCU1 to MCUm are memory control units MCVs which are provided in each cluster. The MCVs are connected between the processors and a global control unit GCU. The global control unit GCU controls the access between clusters, as explained in detail hereinafter, and is contained within a global storage unit GSU. The state of each cluster is defined by the global control unit GCU based on the state of the processors belonging to that cluster. In addition, the global control unit GCU sets up an order for each cluster and controls the processors within each cluster, based on the order for each cluster, through, respective, memory control units MCVs.

In the above structure, since the access between processors is controlled through clusters, it is possible to reduce the control time between processors. Furthermore, it is possible to simplify the control program because access is performed between clusters.

Figure 3:
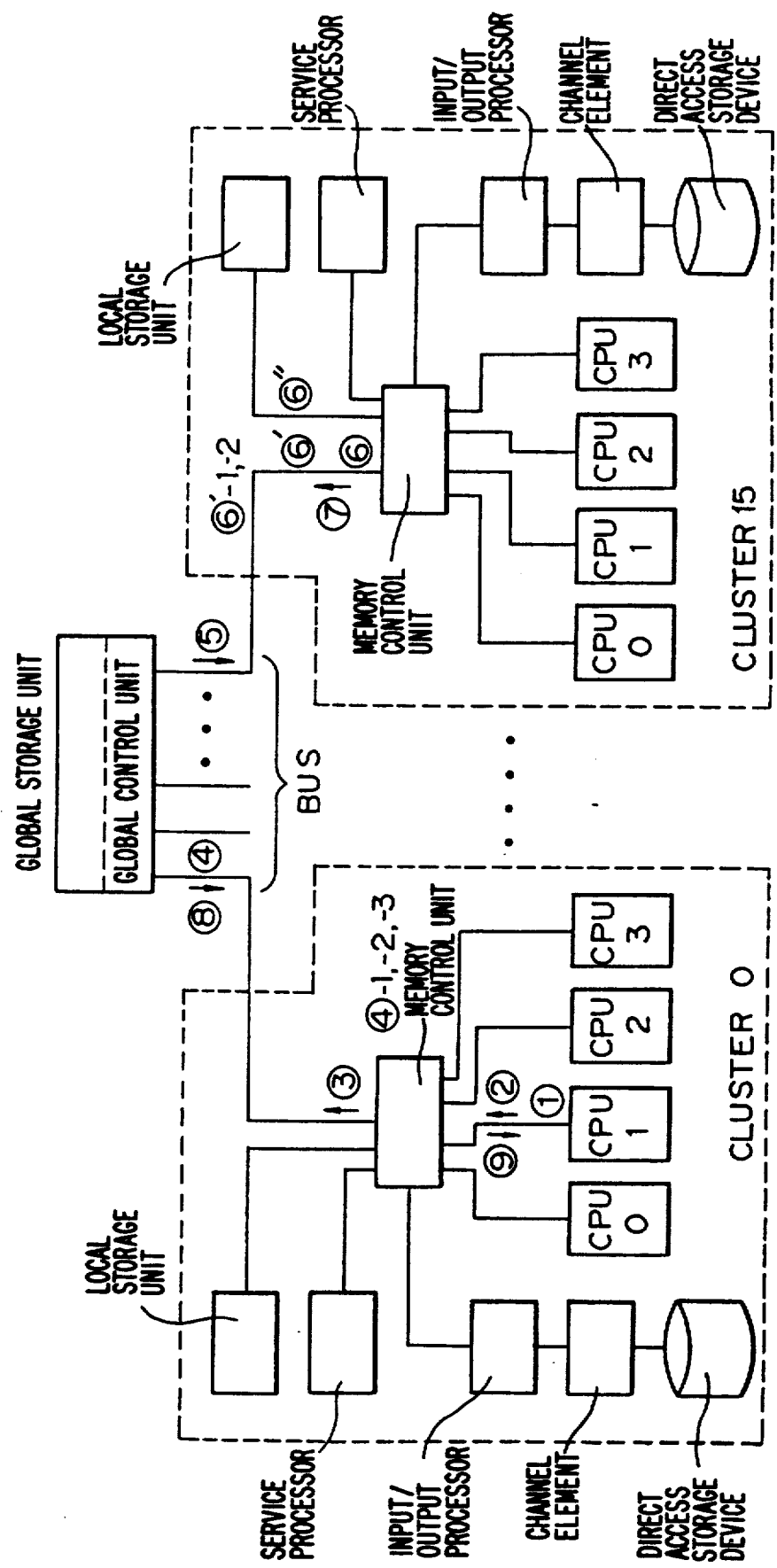
FIG. 3 is a schematic block diagram of a cluster according to an embodiment of the present invention.

FIG. 3 is a schematic block diagram of a cluster according to an embodiment of the present invention. In FIG. 3, the multiprocessor system is constituted by sixty four processors, which are divided into sixteen clusters having four processors CPU0 to CPU3 each. Therefore, the global control unit GCU controls only sixteen clusters 0 to 15 through the bus line BUS. In this case, each cluster has the same structure. For example, the cluster 0 comprises a memory control unit MCU, four processors CPU0 to CPU3, a local storage unit LSU, a direct access storage device DASD, a service processor SVP, an input/output processor IOP, and a channel element CHE connected between the MCU and the DASD. A single global control unit GCU is used in common by all of the clusters 0 to 15, and is connected to each cluster through the bus line BUS.

The processors, and belonging to each cluster are defined by the four states "STOP", "OPERATION", "LOAD", and "CHECK-STOP". There four states are exclusive therebetween and change under the following conditions:

(1) When an operator uses an operating facility;

(2) When the processor receives a specified "SIGNAL-PROCESSOR (SIGP)" order for that processor; and (3) When the cluster having that processor receives a specified "GLOBAL SIGNAL PROCESSOR (GSIGP)" order for that cluster.

Moreover, the state of each cluster is based on the state of the processors belonging to a respective cluster, as follows.

CLUSTER-STOP

None of the processors in the cluster are in the OPERATION or LOAD states, and at least one processor in the cluster is in the STOP state.

CLUSTER-CHECK-STOP

None of the processors are in the STOP, OPERATION or LOAD states. In addition includes the CLUSTER-CHECK-STOP states where the processors are not connected to each other or where none of the processors are supplied with power.

SUBSYSTEM-DAMAGE

When channel subsystem damage is found in a cluster, the cluster is placed in the SUBSYSTEM-DAMAGE state. When the SUBSYSTEM-DAMAGE state is set, the CLUSTER-STOP or CLUSTER-CHECK-STOP states are simultaneously set in the cluster.

In this embodiment, when one processor commands another processor to process an order, the command is sent to the cluster to which the other processor belongs and is not sent directly to the other processor.

The three main orders which are sent to each cluster are defined as follows. Namely, a CLUSTER-SENSE order, a CLUSTER-SYNCHRONOUS-CALL order (floating interruption order), and a CLUSTER-RESET and LOAD order (RESET and IPL order). In addition, for example, a CLUSTER-BROADCAST-INTERRUPTION order for accessing the same order to all clusters and CLUSTER-ASYNCHRONOUS-INTERRUPTION order are sent, these orders are illustrated below as GSIGP orders. A GSIGP order is mainly used for a floating interruption between the processors, as explained hereinafter.

The operation of these orders is explained in detail hereinafter.

CLUSTER-SENSE order

Figure 7A:
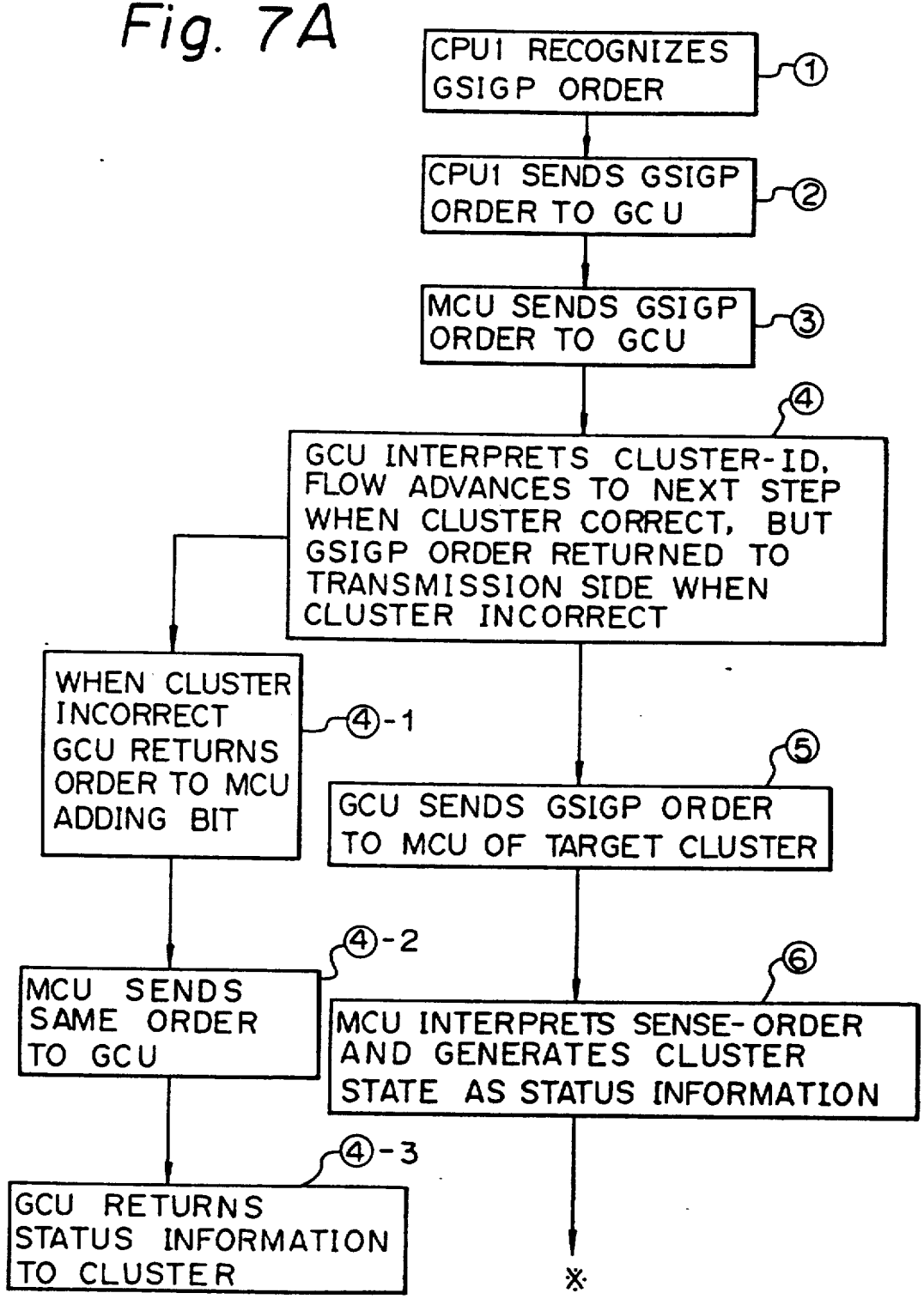
FIG. 7A and 7B together is a flowchart for explaining a CLUSTER-SENSE order according to an embodiment of the present invention.
Figure 7B:
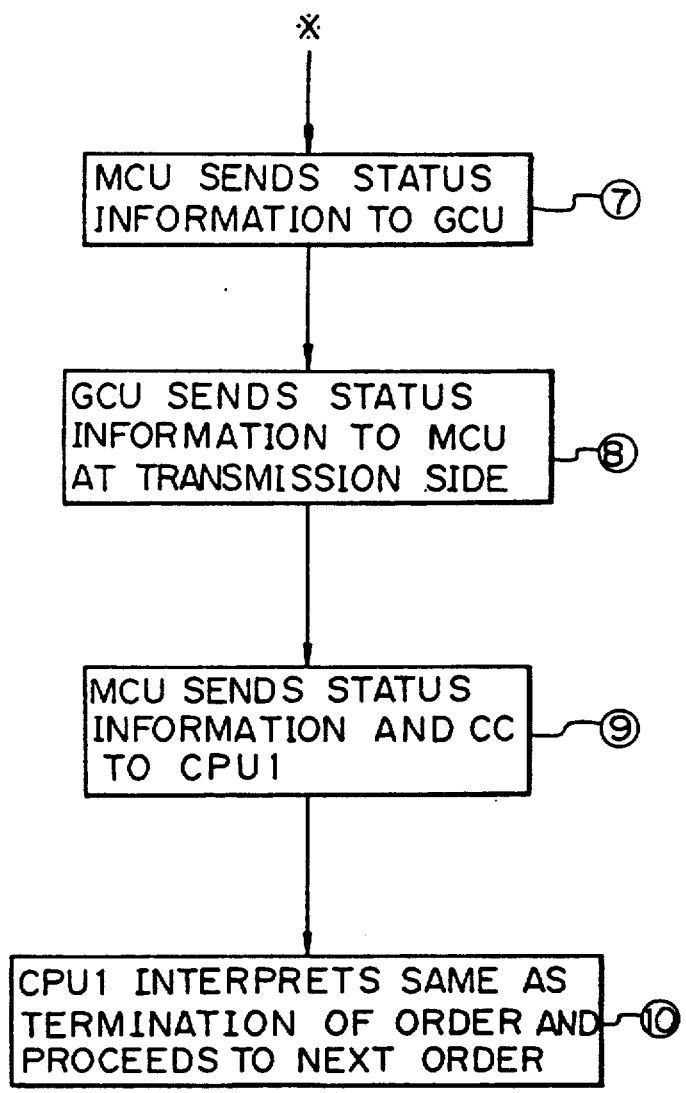

In FIG. 3, the encircled numbers correspond to the following steps. A flowchart corresponding to these steps is shown in FIGS. 7A and 7B.

① The processor 1 (CPU1) in the cluster 0 decodes and recognizes the GSIGP order.

② The processor 1 sends the GSIGP order to the memory control unit MCU. The GSIGP order includes a CLUSTER-ID portion and an ORDER portion.

③ The memory control unit MCU sends the GSIGP order to the global control unit GCU. The GSIGP order includes a SENSE order, a CLUSTER-ID and a parameter, as shown in FIG. 4.

④ The global control unit GCU interprets the CLUSTER-ID. When the correct cluster (connected to the GCU) is designated, the flow proceeds to the next step. When the designated cluster is incorrect, the GSIGP order is returned to the cluster at the transmission side along with the information indicating "incorrect destination".

⑤ The global control unit GCU sends the GSIGP order to the memory control unit MCU of the target cluster.

⑥ When the memory control unit MCU at the reception side interprets the SENSE order, it generates the state of that cluster as the status information based on the states of the processors, the information from the input/output processor IOP, and the states of the synchronous call (floating interruption order) in the MCU.

⑦ The memory control unit MCU in the cluster at the reception side sends the status information of that cluster to the global control unit GCU.

⑧ The global control unit GCU sends the received status information to the memory control unit MCU in the cluster at the transmission side.

⑨ The memory control unit MCU sends the received status information and a condition code (CC) to the processor CPU1 which generated the GSIGP order.

⑩ When the processor CPU1 receives the status information and the condition code CC, it interprets this as a termination of the GSIGP order, and proceeds to the next order.

In the case of an "incorrect destination" mentioned in step ④, as shown in steps ④-1, ④-2 and ④-3, the global control unit GCU returns the GSIGP order including the incorrect destination to the memory control unit MCU at the transmission side in the same formed as a GSIGP order sent from other clusters. In this case, however, a flag bit indicating the incorrect destination is added to the GSIBP order. When the memory control unit MCU at the transmission side recognizes the flag bit in the GSIGP order, the MCU returns the same GSIGP order to the global control unit GCU as the status information. At that time, the content of the GSIGP order is ignored. The global control unit GCU sends the returned status information to the memory control unit MCU at the transmission side as the status information, just as if the status information was received from the destination side in the case of a normal GSIGP order. The interface lines between the MCU and the GCU include a signal line for discriminating either the status information or the order from the transferred information. As explained above, in the case of an incorrect destination, the GSIGP order is sent to the memory control unit MCU as the order and that order is returned to the global control unit GCU, and then that order is again returned to the memory control unit MCU as the status information. This is because these procedures make the operation procedures at the GCU and the MCU almost identical which enables simplification of the control logic (or control hardware).

CLUSTER-SYNCHRONOUS-CALL order

This step is illustrated in FIG. 8.

Since the procedures from step ① to step ⑤ are the same as for the steps shown in FIG. 7, an explanation thereof is omitted. The following step follows step ⑤.

⑥' When the memory control unit MCU of the reception side interprets the CLUSTER-SYNCHRONOUS-CALL order, it determines whether an interruption pending latch of that memory control unit MCU is turned ON or not. When the latch is turned ON, the memory control unit MCU writes the "turned ON state" to the status information. When the latch is turned OFF, the interruption pending latch of the memory control unit MCU is turned ON as shown by steps ⑥'-1 and ⑥'-2.

The same procedures as for step ⑦ to step ⑩ are carried out after the above step ⑥'. As a result, an interruption enabled processor located within the cluster at the reception side is interrupted.

Figure 9:
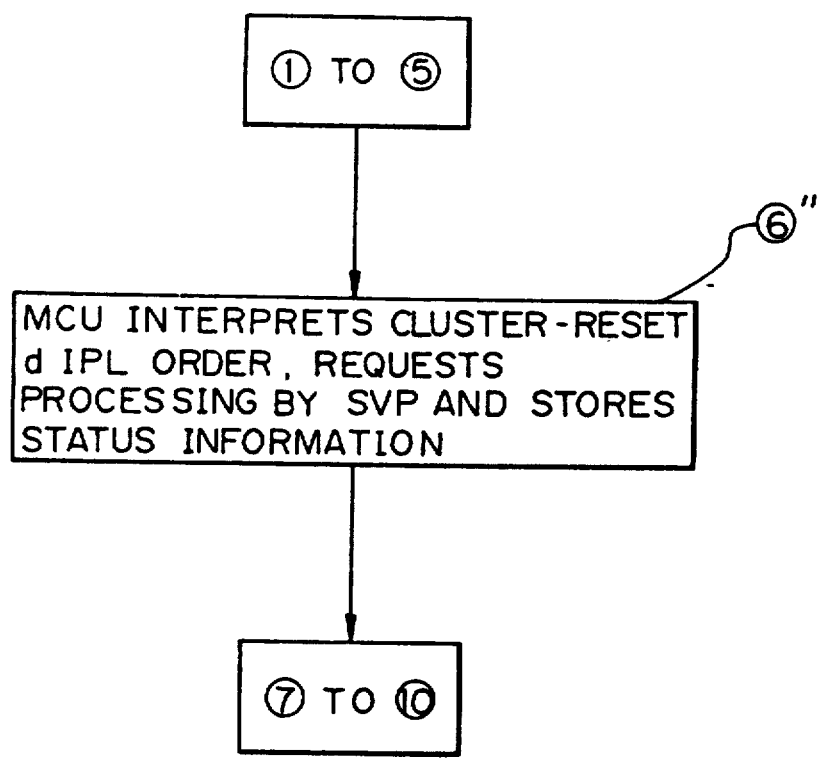

This step is shown in FIG. 9.

Since the procedures from the step 1 to the step ⑤ are the same as for the steps shown in FIG. 7, an explanation thereof is omitted. The following step follows step ⑤.

⑥" The memory control unit MCU at the reception side interprets the CLUSTER-RESET and IPL order, and requests that these orders be processed by the service processor SVP in that cluster. When the transmission of information from the memory control unit MCU to the service processor SVP is completed, the memory control unit MCU stores the status information. The following procedures are the same as for step ⑦ to step ⑩ shown in FIG. 7.

The service processor SVP at the reception side resets all devices in the cluster, starts an IPL (Initial Program Loading) operation, and writes a control program from the direct access storage device DASD to the local storage unit LSU.

In this case, since the IPL operation is performed asynchronously to the termination of the order at the transmission side, as shown by step ⑩. The IPL operation is not always terminated in the reception side even if the order at the transmission side is terminated.

FIG. 5 is a schematic block diagram of a global control unit according to an embodiment of the present invention. The global control unit GCU is an essential part of the global storage unit GSU. In FIG. 5, RCV represents a receiver, PRT a priority circuit, LRCL a logical-to-real cluster translation logic circuit, LRCT a logical-to-real cluster translation table, CCNT a cluster connecting table, CPON a cluster power-on table, MPX a multiplexer, ECD an encoder, ORD an order, and DRV a driver.

The order ORD1 comprises a CLUSTER-INVALID (IV), a LOGICAL-CLUSTER-ID (LCI), a command (COM) and a parameter (PRM). Further, the order ORD2 comprises a LOGICAL-DRIVE-CLUSTER-ID (LDCI) instead of the LOGICAL-CLUSTER-ID (LCI). RDCI is a REAL-DRIVE-CLUSTER-ID and RRCI is a REAL-RECEIVE-CLUSTER-ID.

The cluster connecting table CCNT indicates the state of connection of the clusters; the command COM designates the order of the GSIGP; the cluster power-on table CPON indicates a power-on/off state of the clusters; the driver DRV transfers the order to the clusters; and, the encoder ECD encodes the IV bit and the RRCI bit and determines the destination of the processor transferring the command. The bit IV indicates the invalidity of the cluster, and is normally "0" when generating the command request and "1" when the designated cluster does not exist or the power is not turned ON. The bit LCI is a logical identifier and the target of the request is designated by the logical cluster number. The bit LDCI is a logical processor number of the processor generating the request and sets the output of the table LRCL.

The circuit LRCL is a logical circuit for converting a logical cluster number to a physical cluster number. The circuit LRCL inputs the bit LCI and outputs the bit RRCI by referring to the table LRCT. During the conversion, the circuit LRCL checks whether or not the designated real cluster is connected (command CCNT) and the power of the designated real cluster is turned ON. If the designated cluster is incorrect, the bit IV is turned ON. In addition, the circuit LRCL converts the bit RDCI to the bit LDCI.

The table LRCT refers to the relationship between the logical cluster number and the physical cluster number. The multiplexer MPX selects the cluster generating the request. The parameter PRM is an order of the GSIGP and the order necessitating the parameter is transferred through the PRM. The priority circuit PRT determines the cluster competition state and based on predetermined rules of priority gives the priority right to one of the requests. The receiver RCV receives the requests from the clusters CLU0 to CLU3. The bit RDCI is a real cluster number of the cluster which generated the request and is set by the output of the priority circuit PRT. The bit RRCI is a register indicating the destination cluster for the request and is set by the output of the circuit LRCL.

Figure 6:
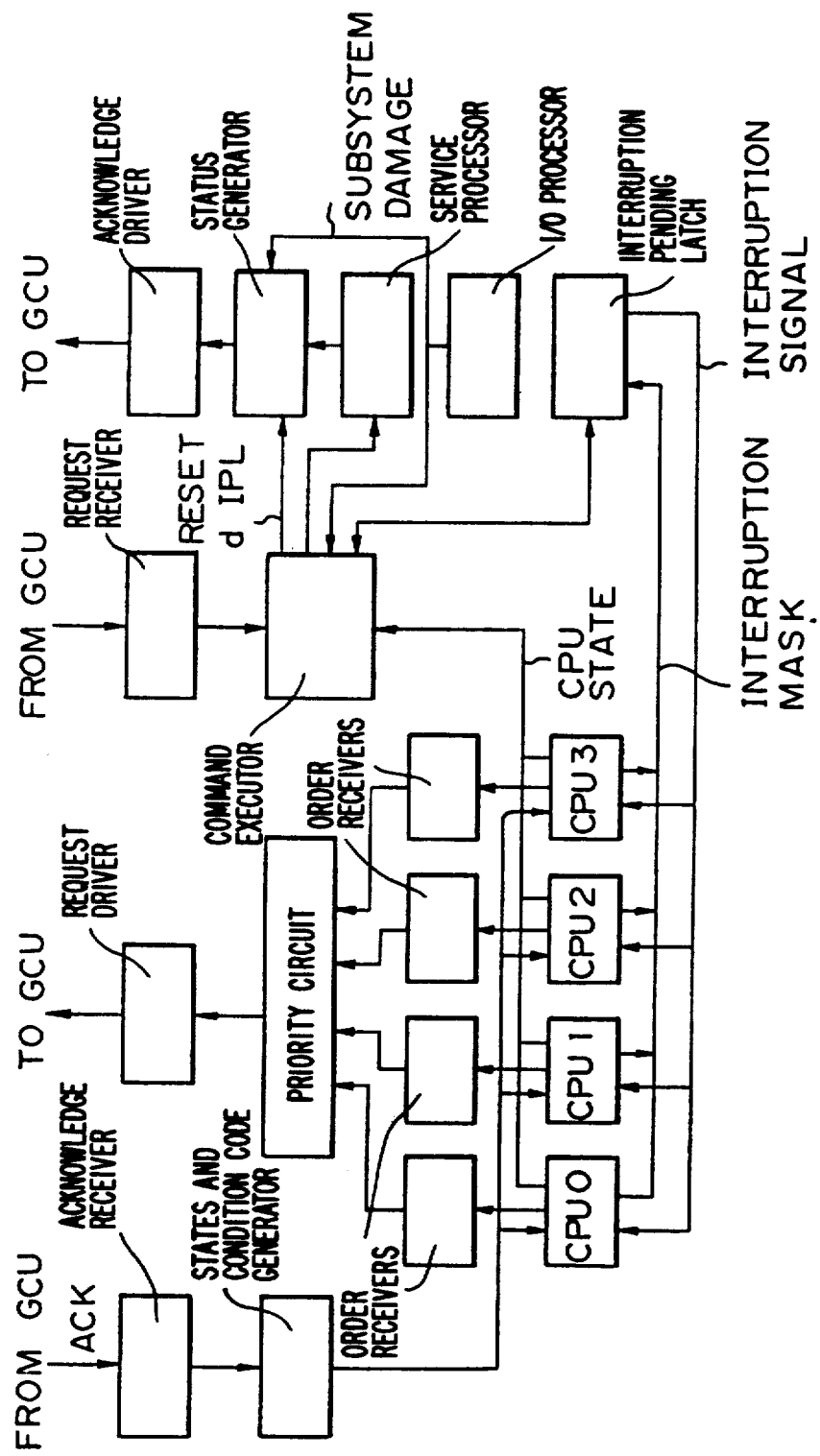
FIG. 6 is a schematic block diagram of a memory control unit according to an embodiment of the present invention.

FIG. 6 is a schematic block diagram of the memory control unit MCU according to an embodiment of the present invention. In FIG. 6, GORV represents a GSIGP order receiver, SCGE a states and condition code generator, GARV a GSIGP acknowledge receiver, GRDV a GSIGP request driver, GRRV a GSIGP request receiver, COEX a command executor, ITPL an interruption pending latch, IOP an I/O processor, SGE a status generator, and GADV a GSIGP acknowledge driver.

The GSIGP acknowledge receiver GARV is a circuit receiving the acknowledge ACK from the global control unit GCU; the status and condition code generator SCGE is a circuit generating the STATUS and CC order based on the acknowledge ACK; the GSIGP request driver GRDL is a circuit generating the request of the GSIGP to the GCU; the priority circuit PRT is a circuit determining the priority of the request when sent from the processor CPU; the GSIGP order receiver GORV is a circuit receiving the GSIGP request from the processor CPU and generating the request to the global control unit GCU; and the command executor COEX executes the request sent from the GCU through the GSIGP request receiver GRRV. In the SENSE order, the command executor COEX requests the status generator SGE to generate the status information, and in the reset and IPL order, the command executor COEX requests the service processor SVP to generate the status information and requests the status generator SGE to also generate the status information. In the case of an interruption, the command executor COEX checks the state of the interruption pending latch ITPL. If the interruption pending latch ITPL is turned OFF, the command executor COEX turns ON the interruption pending latch ITPL and informs the status generator SGE that the ITPL is turned ON. If the interruption pending latch ITPL is turned ON, the command executor COEX informs the status generator SGE that the ITPL is turned ON.

The interruption pending latch ITPL is turned ON by the request from the command executor COEX. Further, the interruption pending latch ITPL supervises the interruption mask MSK to inhibit the interruption from the processor CPU, detects the processor CPU for which the interrupt mask is turned ON, and derives the interrupt from that processor. The I/O processor IOP carries out the input/output processing. When a fault occurs at the I/O processor IOP, a SUBSYSTEM-DAMAGE signal is sent to the status generator SGE. The service processor SVP carries out the reset of the cluster and the IPL processing. Further, the service processor SVP processes the operator function. The status generator SGE generates the status information in accordance with the request from the command executor COEX. The status generator SGE also takes in the information sent from the service processor SVP and the I/O processor IOP. The GSIGP request receiver GRRV receives the GSIGP request from the global control unit GCU, and the GSIGP acknowledge driver GADV returns the generated status information to the cluster which generated the command.

We claim:

1. A method of cluster control between a plurality of processors constituting a multiprocessor system, said method comprising the steps of:
   (a) dividing the plurality of processors constituting the multiprocessor system into a plurality of clusters, each cluster having a memory control unit and operatively connected to a global control unit;
   (b) defining a cluster state of each of the clusters based on a processor state of the processors belonging to a corresponding cluster, the processor state for each of the processors being one of four exclusive processor states of STOP, OPERATION, LOAD and CHECK-STOP, and the cluster state of each of the clusters being at least one of three cluster states of CLUSER-STOP, CLUSTER-CHECK-STOP and SUBSYSTEM-DAMAGE;
   (c) receiving an order from a processor in a first cluster, the order including a cluster identifier, at the memory control unit of the first cluster;
   (d) identifying a target cluster from the clusters of the multiprocessor system to receive the order based upon the cluster identifier;
   (e) directly transferring the order from the first cluster through the global control unit to the memory control unit of the target cluster, the order providing a GLOBAL SIGNAL-PROCESSOR order including a SENSE order, the cluster identifier and a parameter; and
   (f) controlling operations of at least one of the processors belonging to the target cluster based on the order.

2. A method as claimed in claim 1, wherein the CLUSTER-STOP state is the cluster state when none of the processors belonging to the corresponding cluster are in the OPERATION state and none are in the LOAD state, and at least one of the processors is in the STOP state.

3. A method as claimed in claim 1, the CLUSTER-CHECK-STOP state is the cluster state when none of the processors belonging to the corresponding cluster are in the STOP, OPERATION or LOAD states, when none of the processors are connected to other processors, or when none of the processors are supplied with power.

4. A method as claimed in claim 1, wherein the SUBSYSTEM-DAMAGE state is the cluster state when the cluster recognizes damage to a channel subsystem of the cluster.

5. A method as claimed in claim 1, wherein said transferring in step (e) includes setting the GLOBAL SIGNAL-PROCESSOR order to an order comprising:
   one of a CLUSTER-SENSE order, a CLUSTER-SYNCHRONOUS-CALL order, and a CLUSTER-RESET and LOAD order;
   a CLUSTER-ID; and,
   a parameter.

6. A method as claimed in claim 1, wherein said transferring in step (e) includes setting the GLOBAL SIGNAL-PROCESSOR order to an order comprising:
   one of a CLUSTER-BROADCAST-INTERRUPTION order and a CLUSTER-ASYNCHRONOUS-INTERRUPTION order;
   a CLUSTER-ID; and,
   a parameter.

7. An apparatus for cluster control in a multiprocessor system having a plurality of processors formed in clusters, processor orders being transmitted between the clusters, the apparatus comprising:
   a global control unit, operatively connected to each of the clusters, said global control unit comprising:
      a priority circuit, operatively connected to each of the clusters, for determining a priority of processor orders sent from each of the clusters;
      a logical-to-real cluster translation logic circuit, operatively connected to said priority circuit, for converting a logical cluster number to a physical cluster number;
      a cluster connection table, operatively connected to said logical-to-real cluster translation logic circuit, for indicating a connection state of the clusters; and
      a cluster power-ON table, operatively connected to said logical-to-real cluster translation logic circuit, for indicating a power ON/OFF state of the clusters; and
   a memory control unit, provided in each of the plurality of clusters and operatively connected between said global control unit and each of the plurality of processors belonging to a corresponding cluster, for controlling transmission and reception of processor orders between said global control unit and the plurality of processors.

8. An apparatus as claimed in claim 7, wherein each of the clusters comprises:
- a local storage unit, connected to the memory control unit, for storing data;
- a direct access storage device, connected to the memory control unit, for storing data; and
- a service processor, connected to the memory control unit, for processing a reset operation and an initial program loading operation.

9. An apparatus for cluster control in a multiprocessor system having a plurality of processors formed in clusters, processor orders including requests being transmitted between the clusters, said apparatus comprising:
- a global control unit, operatively connected to each of the clusters, for processing processor orders between the clusters; and
- a memory control unit, provided in each of the plurality of clusters and operatively connected between said global control unit and each of the plurality of processors belonging to a corresponding cluster, for controlling transmission and reception of orders between said global control unit and the plurality of processors, the apparatus transmitting requests between said global control unit and said memory control unit, said memory control unit comprising:
  - a priority circuit, operatively connected between the processors and said global control unit, for determining a priority of requests sent from the processors;
  - a command executor for executing the requests sent from the global control unit;
  - a status generator, operatively connected to said command executor, for generating status information in accordance with the requests from said command executor; and
  - an interruption pending latch circuit, operatively connected to said command executer, for inhibiting interruption of at least one of the processors.

10. An apparatus as claimed in claim 9, wherein each of the clusters comprises:
- a local storage unit, connected to the memory control unit, for storing data;
- a direct access storage device, connected to the memory control unit, for storing data; and
- a service processor, connected to the memory control unit, for processing a reset operation and an initial program loading operation.

11. A method for controlling processing operations of a multiprocessor system having a plurality of processors arranged in clusters, each cluster including a memory control unit and a global control unit, said method comprising the steps of:
  (a) generating an order including a cluster identifier at a source processor in a source cluster;
  (b) transferring the order from the source processor to the memory control unit of the source cluster;
  (c) transferring the order from the memory control unit of the source cluster to the global control unit of the multiprocessor system;
  (d) identifying a target cluster form among the clusters of the multiprocessor system to receive the order based upon the cluster identifier;
  (e) directly transferring the order from the global control unit to the memory control unit of the target cluster; and
  (f) processing the order in an identified processor included in processors of the target cluster.

12. A method as claimed in claim 11, further comprising the steps of:
  (g) generating status information of the target cluster in the memory control unit of the target cluster;
  (h) transferring the status information from the memory control unit of the target cluster to the global control unit;
  (i) transferring the status information from the global control unit to the memory control unit of the source cluster; and
  (j) transferring the status information along with a condition code to the source processor of the source cluster to indicate termination of the order.

13. A method as claimed in claim 11, further comprising the steps of:
  (g) determining if the target cluster is an incorrect cluster designation;
  (h) returning the order along with an error flag from the global control unit to the memory control unit of the source cluster when the cluster designation is determined to be incorrect;
  (i) transferring the order returned in step (h) as status information from the memory control unit of the source cluster to the global control unit; and
  (j) transferring the status information from the global control unit to the memory control unit of the source cluster.

14. A method of cluster control between a plurality of processors constituting a multiprocessor system, said method comprising the steps of:
  (a) dividing the plurality of processors constituting the multiprocessor system into a plurality of clusters, each cluster having a memory control unit and operatively connected to a global control unit;
  (b) defining a cluster state of each of the clusters based on a processor state of the processors belonging to a corresponding cluster, the processor state for each of the processors being one of four exclusive processor states of STOP, OPERATION, LOAD and CHECK-STOP;
  (c) receiving an order from a processor in a first cluster, the order including a cluster identifier at the memory control unit of the first cluster;
  (d) identifying a target cluster from the clusters of the multiprocessor system to receive the order based upon the cluster identifier;
  (e) directly transferring the order from the first cluster through the global control unit to the memory control unit of the target cluster; and
  (f) controlling operations of at least one of the processors belonging to the target cluster based on upon the order.

15. A method of cluster control between a plurality of processors constituting a multiprocessor system, said method comprising the steps of:
  (a) dividing the plurality of processors constituting the multiprocessor system into a plurality of clusters, each cluster having a memory control unit and operatively connected to a global control unit;
  (b) defining a cluster state of each of the clusters based on a processor state of the processors belonging to a corresponding cluster, the cluster state of each of the clusters being at least one of three cluster states of CLUSTER-STOP, CLUSTER-CHECK-STOP and SUBSYSTEM-DAMAGE;

(c) receiving an order from a processor in a first cluster, the order including a cluster identifier, at the memory control unit of the first cluster;

(d) identifying a target cluster from the clusters of the multiprocessor system to receive the order based upon the cluster identifier;

(e) directly transferring the order from the first cluster through the global control unit to the memory control unit of the target cluster; and (f) controlling operations of at least one of the processors belonging to the target cluster based upon the order.

16. A method of cluster control between a plurality of processors constituting a multiprocessor system, said method comprising the steps of:

(a) dividing the plurality of processors constituting the multiprocessor system into a plurality of clusters, each cluster having a memory control unit and operatively connected to a global control unit;

(b) defining a cluster state of each of the clusters based on a processor state of the processors belonging to a corresponding cluster;

(c) receiving an order from a processor in a first cluster, the order including a cluster identifier, at the memory control unit of a first cluster;

(d) identifying a target cluster from the clusters of the multiprocessor system to receive the order in dependence upon the cluster identifier;

(e) directly transferring the order from the first cluster through the global control unit to the memory control unit of the target cluster, wherein the order is a GLOBAL SIGNAL-PROCESSOR order including a SENSE order, the cluster identifier and a parameter; and (f) controlling operations of at least one of the processors belonging to the target cluster based upon the order.

* * * * *

UNITED STATES PATENT AND TRADEMARK OFFICE
CERTIFICATE OF CORRECTION

PATENT NO. : 5,228,127
DATED : July 13, 1993
INVENTOR(S) : IKEDA et al.

It is certified that error appears in the above-indentified patent and that said Letters Patent is hereby corrected as shown below:

Col. 2, line 34, after "from" insert --one--;
line 35, delete "and".

Col. 3, line 24, delete ", and";
line 26, change "There" to --These--.

Col. 4, line 22, change "③" to --④--;
line 57, change "formed" to --format--.

Col. 7, line 58, change "CLUSER-STOP" to --CLUSTER-STOP--.

Col. 9, line 39, change "executer" to --executor--.

Signed and Sealed this

Nineteenth Day of July, 1994

Attest:

BRUCE LEHMAN

Attesting Officer  Commissioner of Patents and Trademarks